(12) United States Patent
Gerstenberger et al.

(10) Patent No.: US 7,725,101 B2
(45) Date of Patent: May 25, 2010

(54) METHOD AND ARRANGEMENT IN A TELECOMMUNICATION SYSTEM

(75) Inventors: Dirk Gerstenberger, Kista (SE); Ingela Ericsson, Sollentuna (SE); Joakim Bergström, Stockholm (SE); Peter Edlund, Tumba (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 776 days.

(21) Appl. No.: 10/595,256

(22) PCT Filed: Oct. 6, 2003

(86) PCT No.: PCT/SE03/01557

§ 371 (c)(1),
(2), (4) Date: Feb. 9, 2007

(87) PCT Pub. No.: WO2005/034565

PCT Pub. Date: Apr. 14, 2005

(65) Prior Publication Data

US 2008/0032698 A1 Feb. 7, 2008

(51) Int. Cl.
H04L 29/06 (2006.01)
(52) U.S. Cl. .................. 455/414.3; 455/414.1; 455/405
(58) Field of Classification Search .............. 455/423.3, 455/456.2, 405, 406, 414.3
See application file for complete search history.

(56) References Cited

U.S. PATENT DOCUMENTS

| | | | |
|---|---|---|---|
| 6,839,336 B2* | 1/2005 | Tiedemann et al. ......... | 370/335 |
| 6,957,063 B1* | 10/2005 | Kåll ........................ | 455/414.1 |
| 2002/0075824 A1* | 6/2002 | Willekes et al. ............. | 370/329 |
| 2003/0087653 A1* | 5/2003 | Leung et al. ................. | 455/502 |
| 2003/0134655 A1* | 7/2003 | Chen et al. .................. | 455/522 |
| 2003/0207696 A1 | 11/2003 | Willenegger et al. | |
| 2004/0053619 A1* | 3/2004 | Kim et al. ................... | 455/445 |
| 2005/0058116 A1* | 3/2005 | Palin et al. .................. | 370/345 |

FOREIGN PATENT DOCUMENTS

| | | |
|---|---|---|
| EP | 1119132 A2 | 7/2001 |
| EP | 1309213 A1 | 5/2003 |
| EP | 1359782 A1 | 11/2003 |
| JP | 2002-261760 | 9/2002 |
| JP | 2002-368757 | 12/2002 |
| WO | WO 9916277 A2 | 4/1999 |
| WO | WO 03/036908 A1 | 5/2003 |

\* cited by examiner

Primary Examiner—Kent Chang
Assistant Examiner—Magdi Elhag

(57) ABSTRACT

A method and user equipment in a mobile telecommunications system for conducting a multimedia broadcast/multicast service (MBMS) session. An MBMS-uplink channel is introduced for transmitting from the user equipment, MBMS participation requests prior to the session and acknowledgment messages when MBMS messages are received. Relevant charging information is collected from the user equipment using broadcast/multicast services when an acknowledgment message is received. The telecommunication system then sends a decoding key to the user equipment for decoding at least a part of the data that is broadcast by the MBMS service.

6 Claims, 4 Drawing Sheets

METHOD AND ARRANGEMENT IN A TELECOMMUNICATION SYSTEM

FIELD OF THE INVENTION

The present invention relates to methods and arrangements in a mobile $3^{rd}$ generation communication system and user equipments intended for usage in such systems. The invention relates in particular to charging of user equipments participating in a Multimedia Broadcast/Multicast Service (MBMS). According to the state of the art, a communication system applying MBMS transmits MBMS-data from a single source entity to multiple recipients in the downlink. The service is considered to be a "best-effort" service, e.g. with no requirements for retransmissions in case on lost data.

SUMMARY OF THE INVENTION

The present invention addresses the problem of collecting relevant charging information from user equipments using broadcast/multicast services and, thus, provide network operators with necessary information to enable billing of said user equipments.

The solution according to the present invention proposes to introduce an uplink channel for transmitting MBMS-related control information, e.g. to indicate participation requests for specific MBMS-services or acknowledgement information regarding the reception status of MBMS-data messages that have been sent to user equipments. The present invention further intends to introduce a decoding key for coding and decoding the content of said transmitted MBMS-data messages.

According to the inventive method user equipments must apply to participate in an MBMS-session of a certain MBMS-service and, depending on the type of said service, acknowledge the reception of MBMS-data messages during the ongoing session. The user equipment is charged by the network in response to transmitted acknowledgement messages for successfully received MBMS-data messages and receives decoding keys from the network in response to a charging for previously received MBMS-data messages. The decoding key can be valid either during the entire MBMS-session, parts of such a session, or for only one received MBMS-data message. This validity time is in principle definable by the network operator. Further, when transmitting several decoding keys during an MBMS-session the present invention allows the operator to apply an adaptive charging for transmitted MBMS-data messages during the lapse of an MBMS-session.

The present invention implies the advantage for the operator to allow an efficient billing of user equipments using an MBMS-service that can be based on various charging criterions, e.g. based on the duration of an MBMS-session or the time a user equipment has participated in such a session, or can be based on the amount of data information that has been delivered to the user equipment.

It is another advantage of the present invention that it allows an adaptive charging of user equipments. This means that the network operator can apply different charging profiles, e.g., with respect to the lapsed time of an MBMS-session, or, if experienced by the user, to compensate for value changes of MBMS-data messages with regard to their content or reception quality. The introduction of an uplink channel opens also for possibilities to apply different charging models for various sub-groups of subscribers that participate in one and the same MBMS-session.

Other objects, advantages and novel features of the invention will become apparent from the following detailed description of the invention when considered in conjunction with the accompanying drawings and claims.

DETAILED DESCRIPTION

Figure 1:
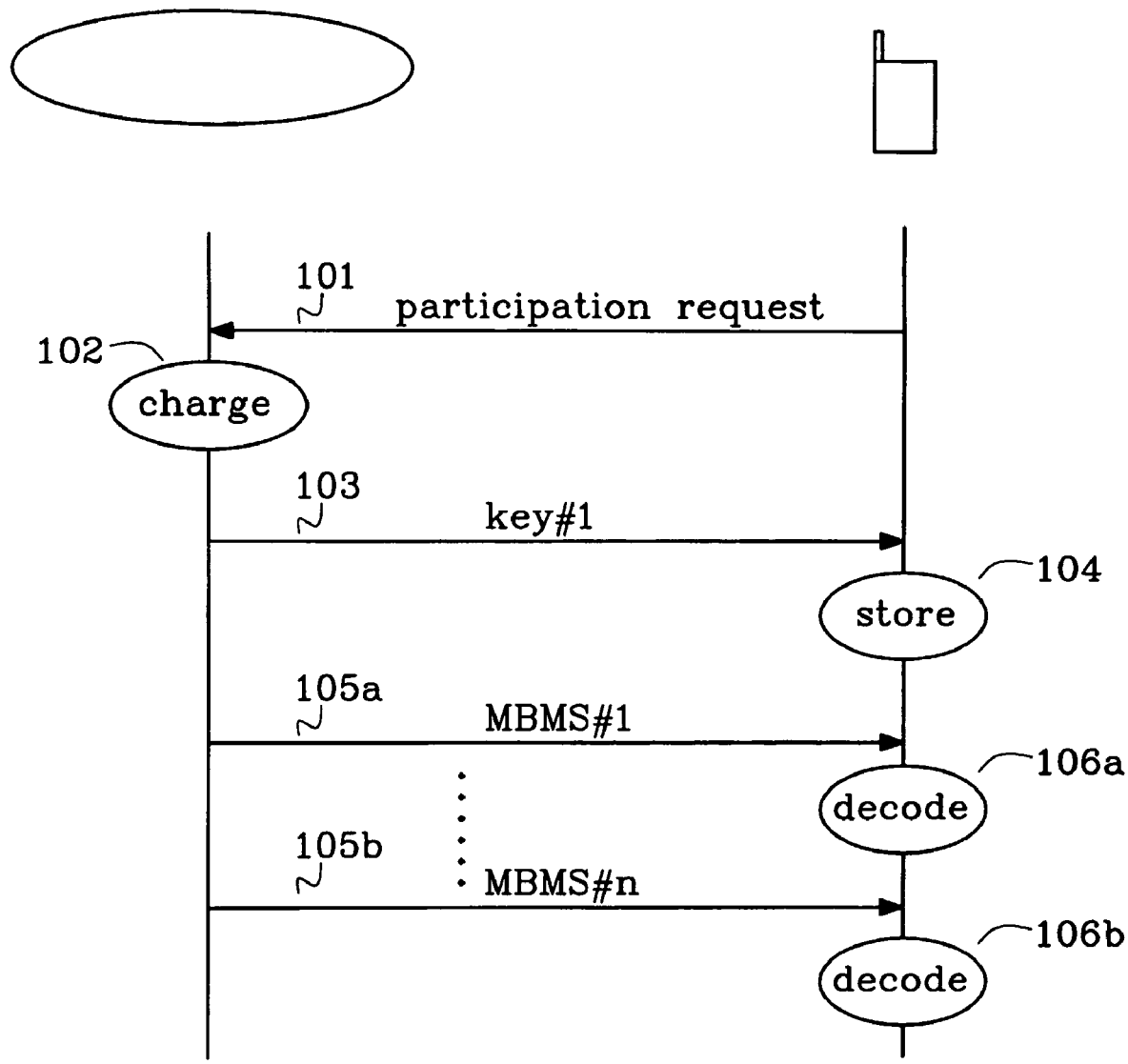
FIG. 1 shows a signalling flow of an MBMS-session between network and a user equipment according to a first embodiment of the present invention.

The following detailed description will describe several embodiments of the solution according to the present invention. The embodiments can be distinguished with regard to the possibilities when the user equipment is charged for MBMS-data messages and when the decoding key for decoding received MBMS-data messages is provided to the user equipment. The embodiments can be applied with regard to different types of MBMS-services that are distinguishable, e.g., with regard to time aspects, i.e. real time or non-real time services, regarding how often or regularly such a service is required, or regarding the type of service, e.g. downloading services or various types of automatic information updating services.

It is a first important feature of the present invention to introduce an uplink channel for transmission of signalling information related to an MBMS-session that a user equipment participates in. The MBMS-uplink channel can be realised on a common uplink channel or as dedicated channels between user equipment and network. This uplink channel is used, e.g., for transmission of acknowledgement messages that acknowledge the successful reception of MBMS-data messages and, thus, provide a base for charging the user equipment. Acknowledgement messages should preferably be as short as possible; they must, however, provide at least an identification indication of the user equipment that acknowledges, if no dedicated channel is used, and an identification of the acknowledged part of an MBMS-session, e.g. by help of a segment number. Within the scope of the present invention an MBMS-data message is regarded to be successfully received if the message content could be presented to the user of the MBMS-service. It is in principal up to the network operator to determine how frequently and at which stages acknowledgement messages are required from user equipments. This decision depends, for instance, on characteristics of the specific MBMS-service, e.g., regarding real-time aspects or regarding the rate of MBMS-data messages that is sent to a user equipment.

The uplink channel is also used by the user equipment to indicate participation in a session of a selected MBMS-service. The same as required for acknowledgement messages also applies to participation messages: They must be short but at least identify the user equipment that intends to participate in an MBMS-session and specify the session and MBMS-service that the user equipment intends to participate in.

A second important feature to secure an efficient charging of user equipments that participate in an MBMS-session is the coding of the content of MBMS-data messages. User equipments will only be able to decode the content of an MBMS-data message by help of a decoding key, which is, in principal, sent in response to an acknowledgement message that indicates that the user equipment has actually received the data messages or, for certain embodiments, already in response to a participation request from a user equipment. In case of successful transmissions of MBMS-data messages the transmission of decoding keys is triggered by a charging of the user equipment for one or more previously received MBMS-data messages. The coding mechanism can be performed according to well-known procedures, e.g. as described in other 3GPP-standardisation documents. The decoding key according to the present invention is thus used to limit the distribution of the content of transmitted MBMS-data messages, in general, to authorised user equipments, i.e. user equipments that can be charged. The decoding key can also be applied to define the access of user equipments to an MBMS-session, e.g. in terms of time or in terms of a number of received MBMS-data messages. The decoding key can thus be valid for an entire MBMS-session or a part of such a session, or for one or several MBMS-data messages.

A first embodiment of the present invention as shown in FIG. 1 concerns broadcast/multicast services for real time transmission of data, i.e. services that require a fast delivery of data with low time delays. For such types of services there is no or only little time for the network system to wait for an acknowledgement from a user equipment during an ongoing MBMS-session. An example to apply such an embodiment are MBMS-sessions that relate to distinct and time-limited events, e.g., a sports event. Preferably, the user equipment is already charged 102 a fixed amount by the network when indicating 101 the participation in such an MBMS-session. In response to the participation message 101, which the user equipment sends on the MBMS-uplink, the network provides a decoding key 103 to this user equipment that is valid for the entire or at least parts of the MBMS-session, either measured in terms of a period of time or in terms of a fixed or maximum number of MBMS-data messages 105a,105b that will be transmitted during the MBMS-session. The decoding key is stored 104 in the user equipment and can be used to decode 106a,106b said incoming MBMS-messages without additional delays that would be caused by acknowledgement messages that must be sent during the ongoing MBMS-session. This embodiment provides thus a comparatively simple charging mechanism, which nevertheless allows an efficient and fair charging of the user equipments.

Figure 2:
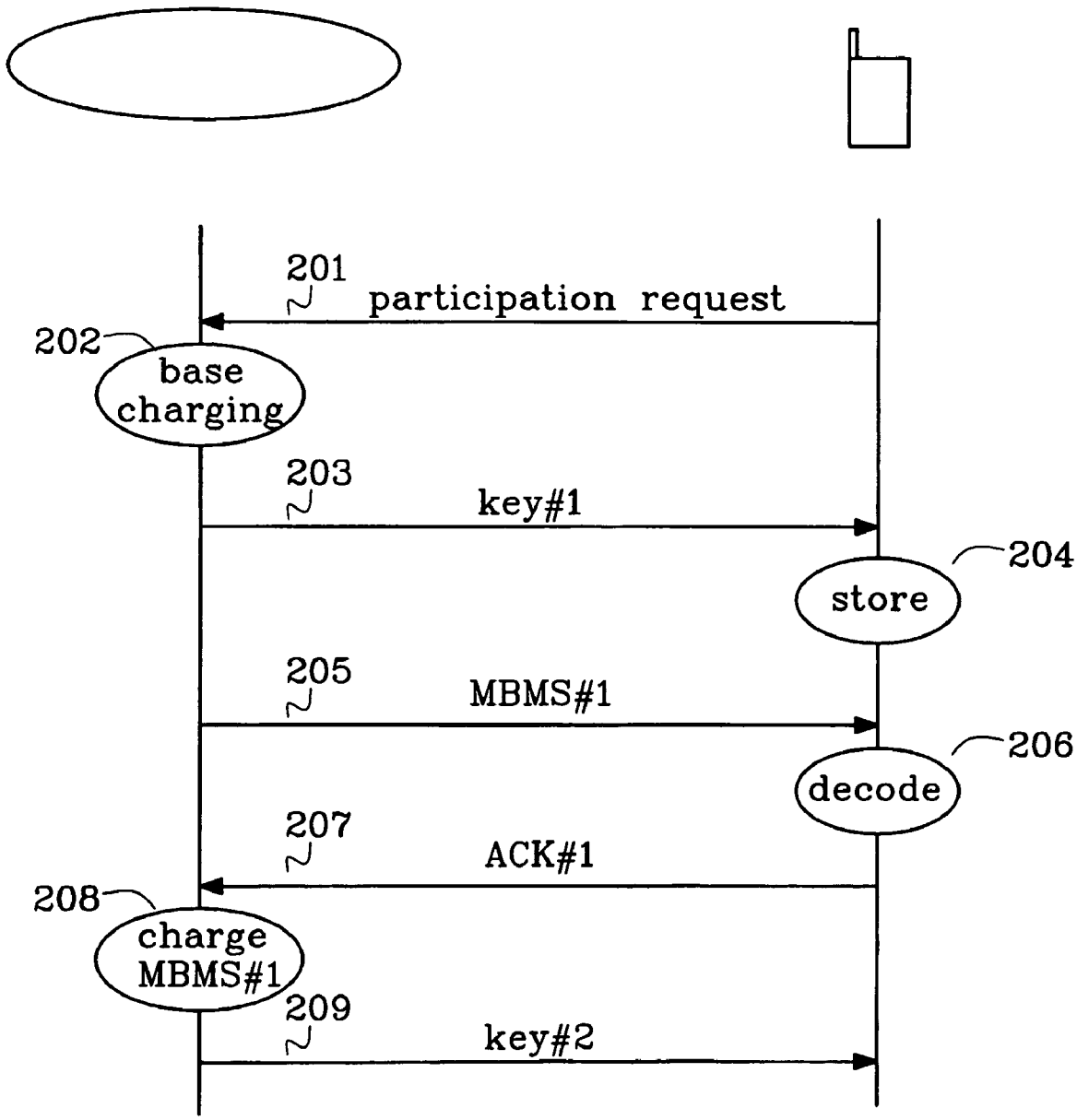
FIG. 2 shows a signalling flow of an MBMS-session between network and a user equipment according to a second embodiment of the present invention.
Figure 3:
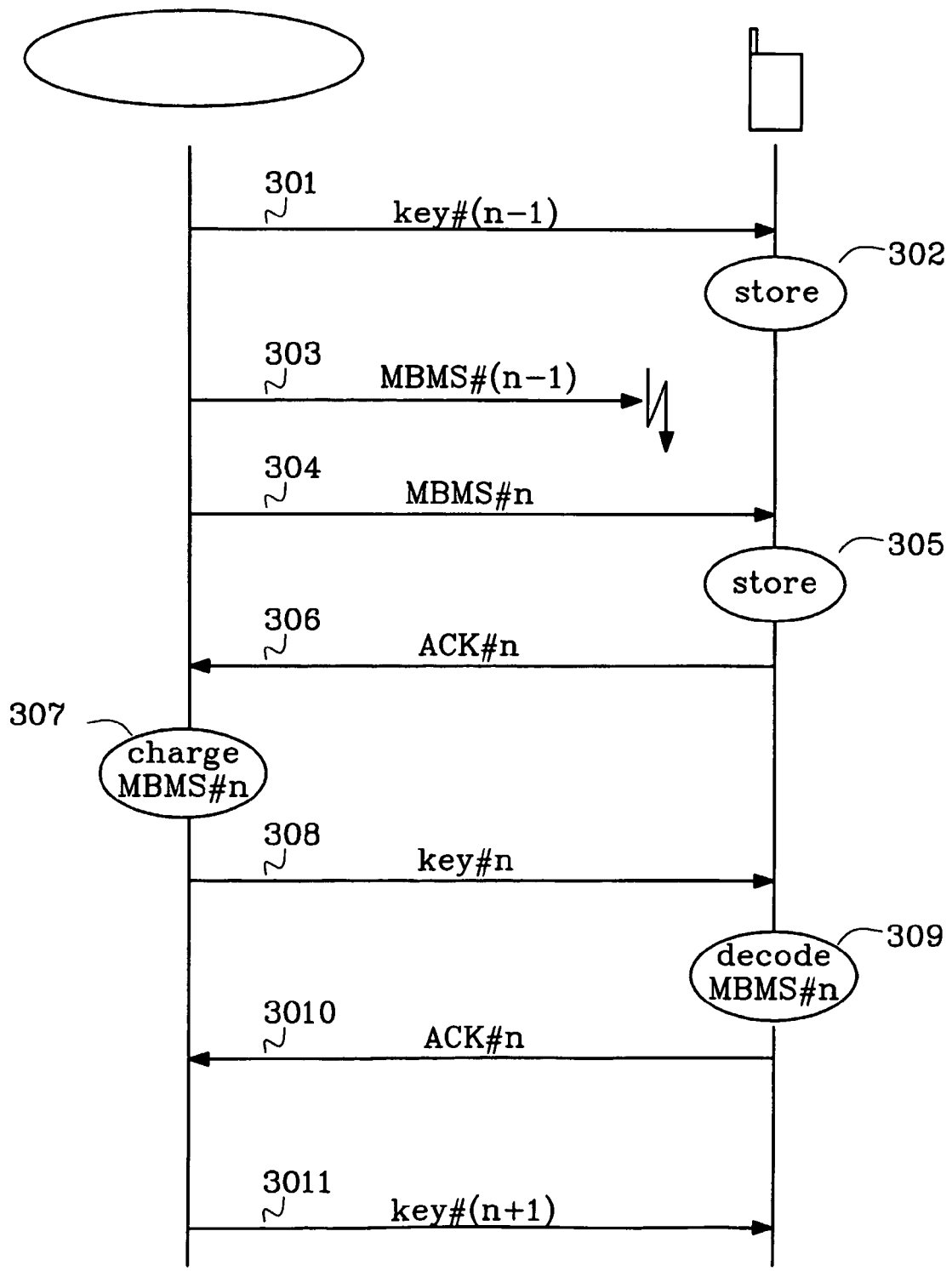
FIG. 3 shows the signalling flow of an MBMS-session between network and a user equipment in case of a missing or erroneous transmission of an MBMS-data message.
Figure 4:
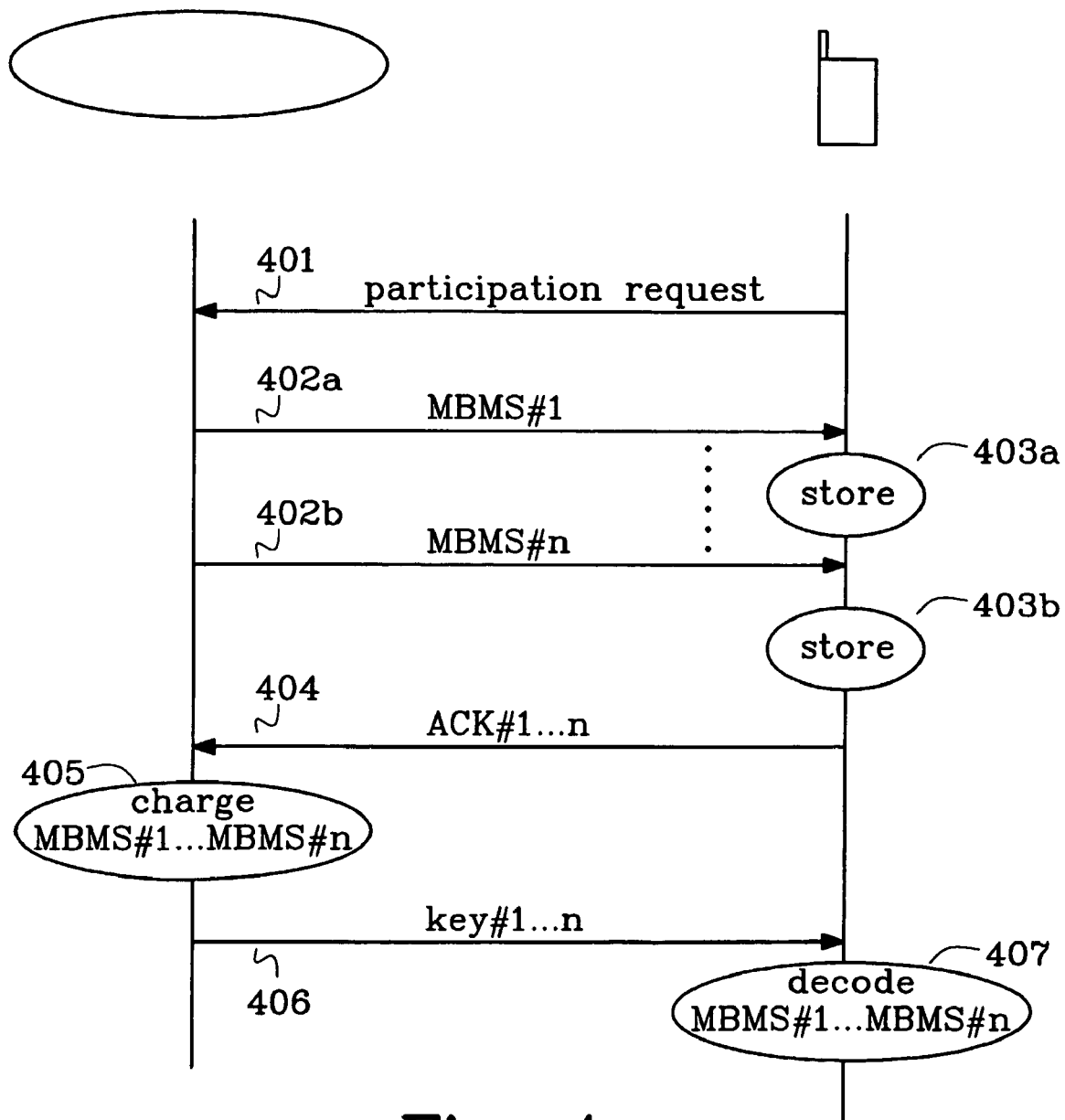
FIG. 4 shows a signalling flow of an MBMS-session between network and a user equipment according to a third embodiment of the present invention.

Two other embodiments of the present invention, which are illustrated in FIGS. 2 and 3, and in FIG. 4 relate to charging for non-real time based MBMS-services. These embodiments relate in principal to a charging of user equipments during an ongoing MBMS-session in response to acknowledgement messages that the user equipment sends on the MBMS-uplink channel after a successful reception of one or more MBMS-data messages. One class of examples of such services are various kinds of reports that are automatically actualised when necessary or during specific time intervals, e.g. related to current traffic status, stock exchange information, or tourist information. A characteristic of these services is that the network sends MBMS-messages more or less automatically without further intervention of the user, i.e. the sending of MBMS-messages is triggered by certain events once the user has indicated to participate in a session of such an MBMS-service. The embodiment of an MBMS-session relating to such services is in the following denoted the "streaming variant". Another class of services comprises media files, e.g. voice or video information, that can be loaded into a user equipment. Such services can be characterised in that the user requests at a distinct time the transmission of one or more MBMS-messages. The embodiment of an MBMS-session relating to such services is in the following denoted the "downloading variant". In both variants charging is done in response to an acknowledgement message from the user equipment indicating a successful reception of one or more MBMS-data messages. The embodiments differ, however, in the sending of the decoding key for said MBMS-data messages. In the streaming variant, the decoding key that is transmitted to the user equipment is valid for one or more MBMS-data messages that will be sent to the user equipment afterwards. In the downloading variant, the decoding key is transmitted after a successful transmission of one or more MBMS-data messages that have been acknowledged by the user equipment.

FIG. 2 describes the message transfer between network and a user equipment for the streaming variant. The user equipment must send a participation request 201 to the network in order to participate in a session of an MBMS-service. In response to said participation request the network provides the user equipment with a decoding key key#1 203, which is stored 204 in the user equipment and can be used for decoding the subsequently transmitted MBMS-data messages MBMS#1 205, or several subsequent MBMS-data messages that the user equipment will receive during said MBMS-session. The network will charge 208 the user equipment for the transmitted MBMS-data message MBMS#1 after said user equipment has transmitted an acknowledgement ACK#1 207 indicating the successful reception of said message. In response to such an acknowledgement message 207 the network sends a new decoding key key#2 209 for the next one or more MBMS-data messages of the session that the user equipment participates in. The streaming variant implies the advantage that the decoding of a received MBMS-data message in the user equipment can be performed comparatively fast because the decoding key is already available at that time. On the other hand, as the decoding key is available before the user equipment is charged for a delivered MBMS-data message that is related to said decoding key, either the first or last MBMS-data message cannot be charged. According to an alternative embodiment of the present invention this disadvantage can be avoided, e.g. by means of a base charge 202 at the time when a user equipment indicates to participate in the MBMS-session. This base charge can, e.g., include the costs for the first MBMS-data message.

As already described above, the transmission of MBMS-data messages according to this embodiment of the present invention can be performed more or less automatically without further intervention of the user. However, this will cause a difficulty when handling situations where a user equipment does not have received one of the transmitted MBMS-data message or, depending on the type of service, has received a faulty MBMS-data message. Such problems can occur, e.g., for a user equipment having temporarily bad radio reception conditions. As the MBMS-service is not defined to provide retransmissions it will be necessary to introduce a simple mechanism that allows to provide as many as possible of the transmitted MBMS-data messages to the user equipment and guarantees a fair charging of the user equipment regarding the relation of transmitted to actually received MBMS-data messages. An embodiment of such a mechanism is described by help of FIG. 3. Said figure shows a part of an MBMS-session as described in FIG. 2. The user equipment has received 301 and stored 302 a decoding key key#(n−1); however, it does not receive the MBMS-data message MBMS#(n−1) 303 that can be decoded by help of said key. Accordingly, the user equipment will not send any acknowledgement message for this data message, which is interpreted by the network that this user equipment does no longer intend to participate in this MBMS-session. Therefore, the user equipment will not receive the decoding key for decoding the following MBMS-data message MBMS#n 304. It is now a first measure of the user equipment to re-integrate in the MBMS-session that it stores 305 the MBMS-data message MBMS#n and sends 306 an acknowledgement message ACK#n although the user equipment cannot decode this message. The network, which keeps track on at least the received acknowledgement messages and possibly the segment numbers of transmitted MBMS-data messages for each of the user equipments participating in an MBMS-session, can detect that this user equipment still intends to participate in the MBMS-session but has not acknowledged the previous MBMS-data message MBMS#(n−1), which implies that this user equipment has not received the decoding key key#n for decoding the latest MBMS-data message MBMS#n. The network will nevertheless charge 307 the user equipment for the latest MBMS-data message MBMS#n but also retransmit 308 the missing decoding key key#n, which is the decoding key that has not been sent due to the previously missing acknowledgement. The user equipment can now decode 309, with a certain delay, the already stored MBMS-data message MBMS#n and will send 3010 the acknowledgement message ACK#n for a second time. The network will not charge a user equipment on reception of acknowledgement messages that have already been received and will instead transmit 3011 the next decoding key key#(n+1) to the re-integrated user equipment.

FIG. 4 describes the message transfer between network and a user equipment for the download variant. Also in this case the user equipment transmits a participation request 401 on the MBMS-uplink channel in order to participate in a session of a desired MBMS-service. Then, the user equipment will receive 402a,402b and store 403a,403b one or more MBMS-data messages MBMS#1 through MBMS#n and transmit after reception of said messages an acknowledgement message ACK#1 . . . n 304 on the MBMS-uplink channel. It is up to the operator to define whether each of said MBMS-data messages must be acknowledged separately or, as indicated in FIG. 4, whether it is sufficient to send one acknowledgement message that acknowledges several MBMS-data messages. As already described above, the network charges 405 the user equipment on reception of said acknowledgement message ACK#1 . . . n. According to this variant the network provides the decoding key 406 key#1 . . . n after transmission of the MBMS-data messages MBMS#1 through MBMS#n and not until after having charged the user equipment. This variant can be in particular advantageous for downloading larger amounts of data, e.g. various types of media files.

The invention claimed is:

1. A method in a network unit of a telecommunication system providing network services to one or more user equipments and transmitting data messages of a multimedia broadcast/multicast service (MBMS), said method comprising:
   receiving MBMS participation requests from the user equipments on a predetermined MBMS-uplink channel;
   registering the user equipments for an MBMS session based on the received participation requests from said user equipments;
   receiving on the predetermined MBMS-uplink channel, an acknowledgement message from a user equipment indicating that one or more MBMS-messages has been received;
   providing charging information in response to receiving the acknowledgment message;
   transmitting one or more decoding keys to the user equipment for decoding one or more MBMS-messages after having charged the user equipment for previously received MBMS-messages;
   maintaining a register for storing segment numbers of at least the received acknowledgement messages of each user equipment that participates in an MBMS session;
   determining from the segment numbers, a missing acknowledgement message;
   retransmitting the decoding key for decoding the latest transmitted MBMS-message in case of a detected missing acknowledgement message; and
   omitting the step of providing charging information when receiving from a user equipment, an acknowledgement message comprising an already received sequence number.

2. The method according to claim 1, wherein the user equipment is already charged in response to said participation request.

3. The method according to claim 1, wherein the charging information also considers a lapsed time during which the user equipment has participated in said MBMS-session.

4. The method according to claim 1, wherein the charging information also considers the user subscription profile.

5. A method in a user equipment of a telecommunication system for conducting a multimedia broadcast/multicast service (MBMS) session, said method comprising:
   transmitting on a predetermined MBMS-uplink channel, a participation request in order to participate in the MBMS session;
   receiving MBMS-messages from the telecommunication system;
   decoding one or more of the received MBMS-messages utilizing a stored decoding key that is provided by the telecommunication system;
   transmitting on said predetermined MBMS-uplink channel, acknowledgement messages for the one or more received MBMS-messages;
   receiving an out-of-sequence MBMS message that cannot be initially decoded;
   storing the out-of-sequence MBMS-message;
   transmitting an acknowledgement message for the out-of-sequence MBMS-message;
   receiving from the telecommunication system, a necessary decoding key for decoding the out-of-sequence MBMS-message;
   decoding the out-of-sequence MBMS-message utilizing the necessary decoding key; and
   transmitting a second acknowledgement message for the out-of-sequence MBMS-message.

6. user equipment for communicating in a telecommunication system and conducting a multimedia broadcast/multicast service (MBMS) session, said user equipment comprising:
   receiving means for receiving MBMS messages and corresponding decoding keys from the telecommunication system;
   decoding means for decoding each of the received MBMS-messages utilizing each MBMS-message's corresponding decoding key;
   transmitting means for transmitting acknowledgement massage for each decoded MBMS-message;
   storing means for storing an out-of-sequence MBMS-message that cannot be initially decoded;

wherein the transmitting means is configured to transmit an acknowledgement message for the out-of-sequence MBMS-message, which has not been decoded;

wherein in response to the acknowledgement message for the out-of-sequence MBMS-message, the telecommunication system sends to the user equipment, a necessary decoding key for decoding the out-of-sequence MBMS message;

wherein the decoding means is configured to decode the out-of sequence MBMS-message utilizing the necessary decoding key; and wherein the transmitting means is configured to transmit a second acknowledgement message for the out-of sequence MBMS-message.

* * * * *